(12) United States Patent
Jeffries

(10) Patent No.: US 9,426,967 B1
(45) Date of Patent: Aug. 30, 2016

(54) ANIMAL FEED TROUGH

(71) Applicant: Mark A. Jeffries, North Canton, OH (US)

(72) Inventor: Mark A. Jeffries, North Canton, OH (US)

( * ) Notice: Subject to any disclaimer, the term of this patent is extended or adjusted under 35 U.S.C. 154(b) by 578 days.

(21) Appl. No.: 13/946,226

(22) Filed: Jul. 19, 2013

Related U.S. Application Data

(60) Provisional application No. 61/673,790, filed on Jul. 20, 2012.

(51) Int. Cl.
*A01K 5/01* (2006.01)
*A01K 1/10* (2006.01)

(52) U.S. Cl.
CPC .. *A01K 5/01* (2013.01); *A01K 1/10* (2013.01)

(58) Field of Classification Search
CPC ........ A01K 1/10; A01K 5/01; A01K 5/0107; A63H 33/06; A63H 33/08; A63H 33/084; A63H 33/105; A63H 33/107; A47B 47/045; A47B 47/042; A47B 47/05; B25H 1/06; B25H 1/00; A47D 7/005; A47D 7/002; A47C 4/00
USPC ................. 248/150, 164, 432, 165
See application file for complete search history.

(56) References Cited

U.S. PATENT DOCUMENTS

| | | | | |
|---|---|---|---|---|
| 339,694 | A * | 4/1886 | Rine et al. ............... | A01K 5/01 119/61.4 |
| 432,671 | A | 7/1890 | Kent ........................... | 119/61.1 |
| 526,249 | A | 9/1894 | Meeker ...................... | 20/9.3 |
| 749,717 | A | 1/1904 | Carpenter .................. | 119/61.1 |
| 2,720,253 | A * | 10/1955 | Turner ...................... | A47B 3/06 248/174 |
| 4,419,938 | A * | 12/1983 | Kaut ....................... | A47B 47/05 108/101 |
| 4,638,885 | A * | 1/1987 | Frederick ................ | B25H 1/06 182/151 |
| 5,052,308 | A * | 10/1991 | Brown ..................... | A47B 3/02 108/115 |
| 5,509,360 | A * | 4/1996 | Chiu ........................ | A47B 3/02 108/119 |
| 5,921,647 | A * | 7/1999 | Schneider .............. | A47B 47/05 211/187 |
| D637,361 | S * | 5/2011 | Jeffries ....................... | D30/121 |
| D677,017 | S | 2/2013 | Jeffries ....................... | D30/131 |

* cited by examiner

Primary Examiner — Korie H Chan
(74) Attorney, Agent, or Firm — Alvin T. Rockhill

(57) ABSTRACT

The present invention discloses an animal feed trough which is comprised of two inside legs, two outside legs, two sides, two ends, and a bottom, wherein the sides include end portions, wherein each of the inside legs includes a slot which extends the entire distance of the inside leg and is adapted to accommodate the end portion of one of the sides, wherein each of the outside legs includes a slot which extends the entire distance of the outside leg and is adapted to accommodate the end portion of one of the sides, wherein each inside leg includes a slot which extends the entire distance of the inside leg and is adapted to accommodate the end portion of one of the ends, wherein each outside leg includes a slot which extends the entire distance of the outside leg and is adapted to accommodate the end portion of one of the ends, and wherein each leg includes a positioning means for positioning the leg relative to one of the other legs.

19 Claims, 2 Drawing Sheets

ANIMAL FEED TROUGH

This application claims the benefit of U.S. Provisional Patent Application Ser. No. 61/673,790 filed on Jul. 20, 2012. The teachings of U.S. Provisional Patent Application Ser. No. 61/673,790 are incorporated herein by reference in their entirety.

FIELD OF THE INVENTION

The present invention relates to animal feed troughs. More specifically the present invention relates to animal feed troughs which are designed for ease of assembly.

BACKGROUND OF THE INVENTION

U.S. Pat. No. 432,671 discloses a folding feed trough consisting of pivoted legs, each of which has secured to it a portion which forms a side of the trough and one of said side portions having rigidly secured to it at an angle bottom portion adapted to lie under the bottom edge of the opposite side portion when the trough is open, and hinged end portions adapted to fold inward substantially as described in the patent. U.S. Pat. No. 526,249 discloses the combination, of the poles A, and the sack B attached to the middle portions of the poles and having loose end portions projecting beyond the ends of the poles, which may be wrapped around the pole ends substantially as specified in the patent. U.S. Pat. No. 749,717 discloses a feed-trough having separate feed-receptacles for a horse and a colt, and a grating in the colt's receptacle having spaces to admit the colt but not the horse. U.S. Pat. No. D637,361 discloses an ornamental design for an animal feeder which is particularly suitable for feeding deer.

SUMMARY OF THE INVENTION

The present invention discloses an animal feed trough which is comprised of two inside legs, two outside legs, two sides, two ends, and a bottom, wherein the sides include end portions, wherein each of the inside legs includes a slot which extends the entire distance of the inside leg and is adapted to accommodate the end portion of one of the sides, wherein each of the outside legs includes a slot which extends the entire distance of the outside leg and is adapted to accommodate the end portion of one of the sides, wherein each inside leg includes a slot which extends the entire distance of the inside leg and is adapted to accommodate the end portion of one of the ends, wherein each outside leg includes a slot which extends the entire distance of the outside leg and is adapted to accommodate the end portion of one of the ends, and wherein each inside leg includes a positioning means for positioning one of the outside legs relative to the inside leg, and wherein each outside leg includes a positioning means for positioning one of the inside legs relative to the outside leg.

In another embodiment of the invention the inside legs are identical, the outside legs are identical, the sides are identical, and the ends are identical.

In yet another embodiment of the invention the sides are affixed to the legs by an affixing means.

In still another embodiment of the invention the affixing means is comprised of dowels.

In yet another embodiment of the invention the affixing means is comprised of nails or screws.

In still another embodiment of the invention the affixing means is comprised of adhesive.

In yet another embodiment of the invention the slots which extend the entire distance of the inside legs and are adapted to accommodate the end portion of one of the sides and the slots which extend the entire distance of the outside legs and are adapted to accommodate the end portion of one of the sides have an angle α which is within a range of about 90° to about 120° and the slots which extend the entire distance of the inside legs and are adapted to accommodate the end portion of one of the sides and the slots which extend the entire distance of the outside legs and are adapted to accommodate the end portion of one of the sides have an angle β which is within a range of about 90° to about 120°.

In still another embodiment of the invention the slots which extend the entire distance of the inside legs and are adapted to accommodate the end portion of one of the sides and the slots which extend the entire distance of the outside legs and are adapted to accommodate the end portion of one of the sides have an angle α which is within a range of about 90° to about 110° and the slots which extend the entire distance of the inside legs and are adapted to accommodate the end portion of one of the sides and the slots which extend the entire distance of the outside legs and are adapted to accommodate the end portion of one of the sides have an angle β which is within a range of about 90° to about 110°.

In yet another embodiment of the invention the slots which extend the entire distance of the inside legs and are adapted to accommodate the end portion of one of the sides and the slots which extend the entire distance of the outside legs and are adapted to accommodate the end portion of one of the sides have an angle α which is within a range of about 90° to about 105° and the slots which extend the entire distance of the inside legs and are adapted to accommodate the end portion of one of the sides and the slots which extend the entire distance of the outside legs and are adapted to accommodate the end portion of one of the sides have an angle β which is within a range of about 90° to about 105°.

In still another embodiment of the invention the slots which extend the entire distance of the inside legs and are adapted to accommodate the end portion of one of the sides and the slots which extend the entire distance of the outside legs and are adapted to accommodate the end portion of one of the sides have an angle α which is within a range of about 90° to about 100° and the slots which extend the entire distance of the inside legs and are adapted to accommodate the end portion of one of the sides and the slots which extend the entire distance of the outside legs and are adapted to accommodate the end portion of one of the sides have an angle β which is within a range of about 90° to about 100°.

In yet another embodiment of the invention the slots which extend the entire distance of the inside legs and are adapted to accommodate the end portion of one of the ends and the slots which extend the entire distance of the outside legs and are adapted to accommodate the end portion of one of the ends have an angle α which is within a range of about 90° to about 120° and the slots which extend the entire distance of the inside legs and are adapted to accommodate the end portion of one of the ends and the slots which extend the entire distance of the outside legs and are adapted to accommodate the end portion of one of the ends have an angle δ which is within a range of about 90° to about 120°.

In still another embodiment of the invention the slots which extend the entire distance of the inside legs and are adapted to accommodate the end portion of one of the ends and the slots which extend the entire distance of the outside legs and are adapted to accommodate the end portion of one of the ends have an angle α which is within a range of about 90° to about 110° and the slots which extend the entire distance of the inside legs and are adapted to accommodate the end portion of one of the ends and the slots which extend the entire distance of the outside legs and are adapted to accommodate the end portion of one of the ends have an angle δ which is within a range of about 90° to about 110°.

In yet another embodiment of the invention the slots which extend the entire distance of the inside legs and are adapted to accommodate the end portion of one of the ends and the slots which extend the entire distance of the outside legs and are adapted to accommodate the end portion of one of the ends have an angle γ which is within a range of about 90° to about 105° and the slots which extend the entire distance of the inside legs and are adapted to accommodate the end portion of one of the ends and the slots which extend the entire distance of the outside legs and are adapted to accommodate the end portion of one of the ends have an angle δ which is within a range of about 90° to about 105°.

In still another embodiment of the invention the slots which extend the entire distance of the inside legs and are adapted to accommodate the end portion of one of the ends and the slots which extend the entire distance of the outside legs and are adapted to accommodate the end portion of one of the ends have an angle γ which is within a range of about 90° to about 100° and the slots which extend the entire distance of the inside legs and are adapted to accommodate the end portion of one of the ends and the slots which extend the entire distance of the outside legs and are adapted to accommodate the end portion of one of the ends have an angle δ which is within a range of about 90° to about 100°.

In yet another embodiment of the invention the slots which extend the entire distance of the inside legs and are adapted to accommodate the end portion of one of the sides and the slots which extend the entire distance of the outside legs and are adapted to accommodate the end portion of one of the sides have a width B which is at least 1 mm wider than width N of the front and back sides, and wherein the slots which extend the entire distance of the inside legs and are adapted to accommodate the end portion of one of the ends and the slots which extend the entire distance of the outside legs and are adapted to accommodate the end portion of one of the ends have a width Y which is at least 1 mm wider than width M of the left and right ends.

In still another embodiment of the invention the slots which extends the entire distance of the inside legs and are adapted to accommodate the end portion of one of the sides and the slots which extend the entire distance of the outside legs and are adapted to accommodate the end portion of one of the sides have a depth C which is within a range of about 5 mm to about 25 mm.

In yet another embodiment of the invention the slots which extend the entire distance of the inside legs and are adapted to accommodate the end portion of one of the ends and the slots which extend the entire distance of the outside legs and are adapted to accommodate the end portion of one of the ends have a depth Z which is within a range of about 5 mm to about 25 mm.

The present invention also discloses a method of assembling an animal feed trough comprising positioning a first outside leg onto a first inside leg so that a positioning means of the first outside leg interconnects with a positioning means of the first inside leg, assembling a left end into an end slot on the first inside leg and an end slot on the first outside leg, positioning a first shorter edge of a front side into a side slot on the first outside leg, positioning a first shorter edge of a back side into a side slot on the first inside leg, positioning a second inside leg onto a second shorter edge of the back side, positioning a second outside leg onto a second shorter edge of the front side and onto the second inside leg so that a positioning means of the second outside leg interconnects with a positioning means of the second inside leg, assembling a right end into an end slot on the second inside leg and an end slot on the second outside leg, and positioning a bottom so that a first longer edge of the bottom rests on the front side and a second longer edge of the bottom rests on the back side.

The present invention further discloses an animal feed trough kit consisting of a first leg which includes a first side slot, a first end slot, and a first positioning means located on a side of the first leg which is opposite the first side slot; a second leg which includes a second side slot, a second end slot, and a second positioning means located on a side of the second leg which also includes the side slot; a third leg which includes a third side slot, a third end slot, and a third positioning means located on a side of the third leg which is opposite the third side slot; a fourth leg which includes a fourth side slot, a fourth end slot, and a fourth positioning means located on a side of the fourth leg which also includes the side slot; a left end; a right end; a front side; a back side; and a bottom.

In another embodiment of the invention the kit further includes dowels which are adapted to affix the front side and back side to the legs and wherein the front side, back side, and legs include holes which are adapted to accept the dowels.

DETAILED DESCRIPTION OF THE INVENTION

Figure 1:
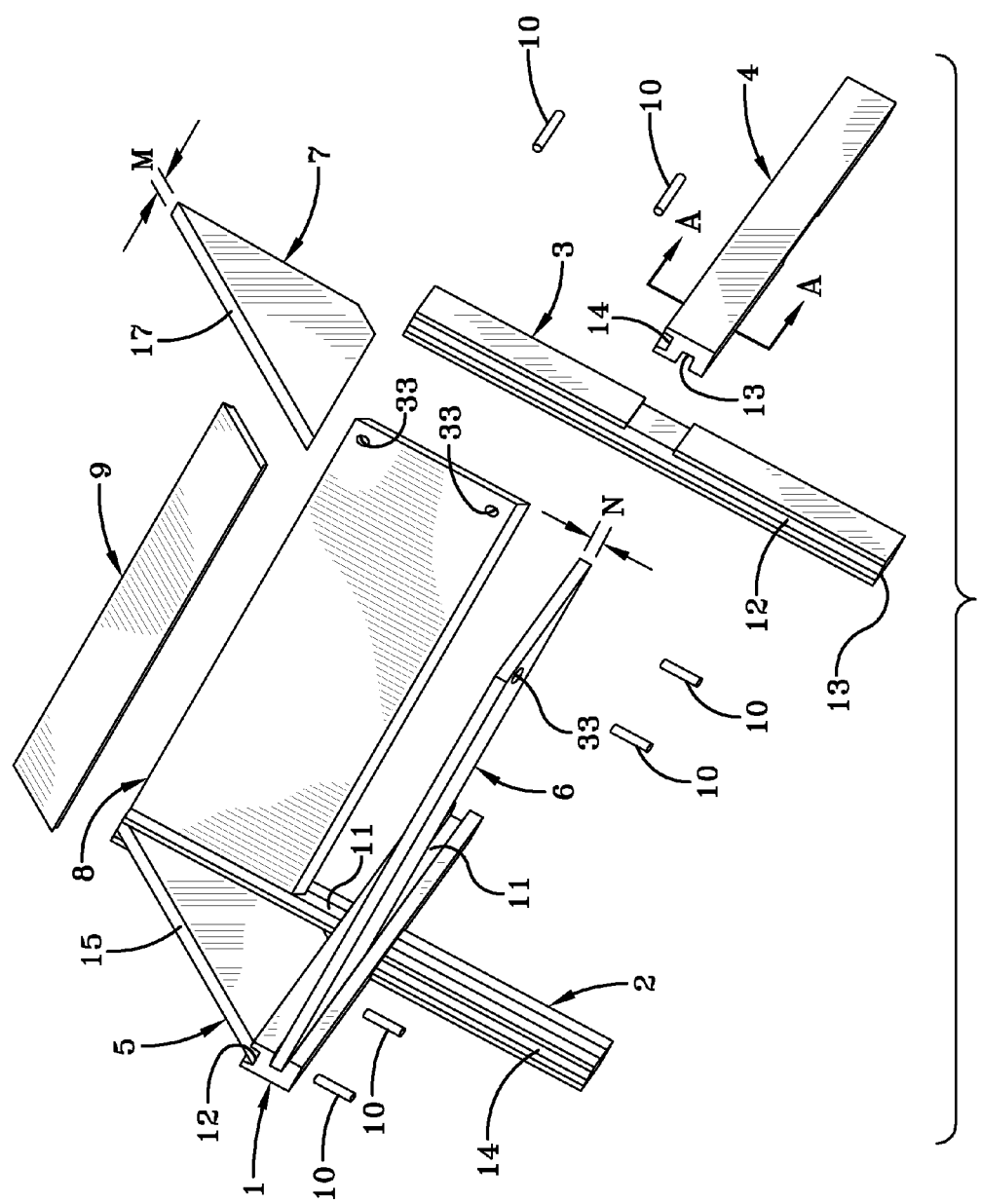
FIG. 1 is a partially exploded prospective view of the animal feed trough of the present invention.
Figure 2:
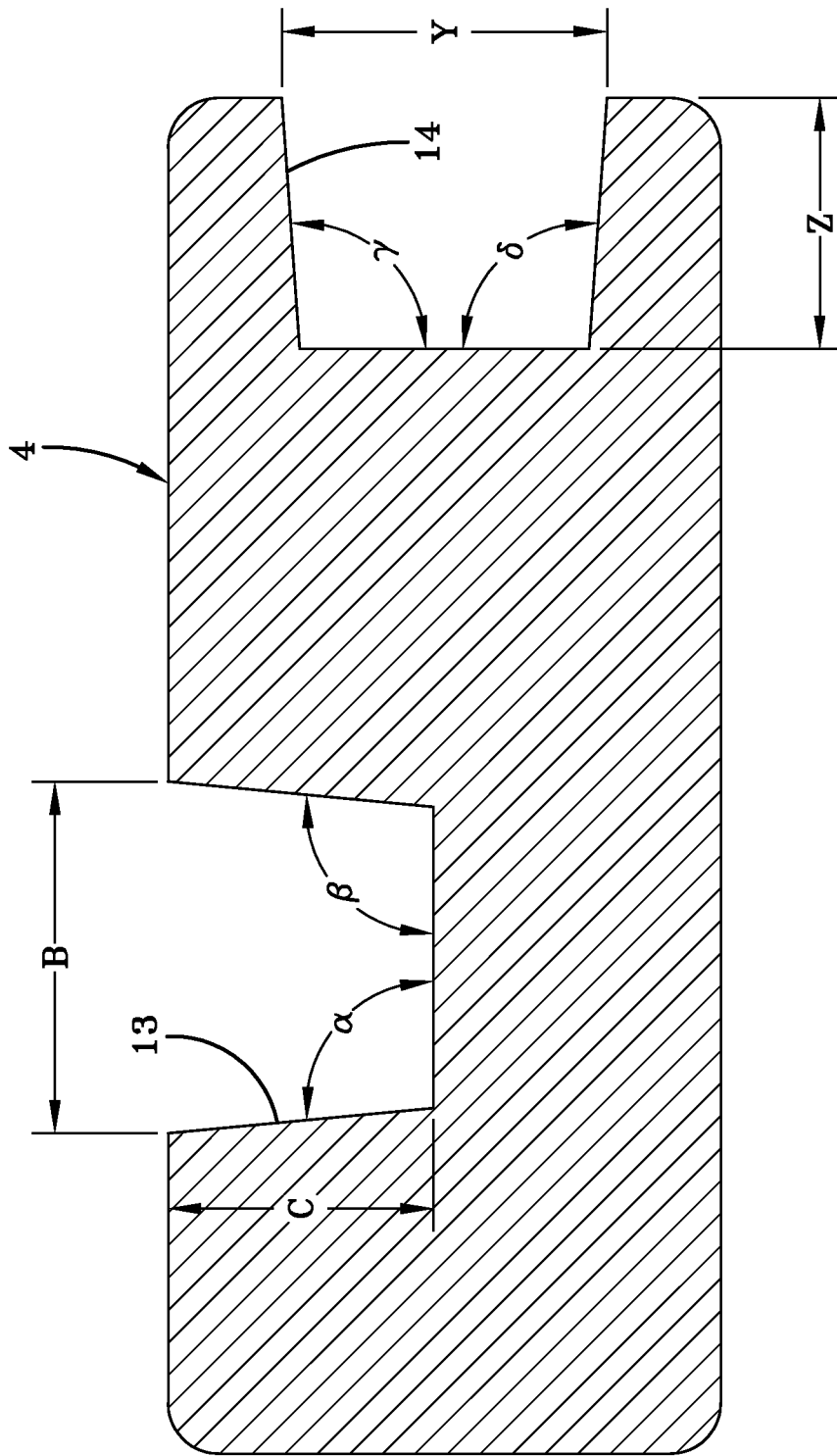
FIG. 2 is a cross-sectional view of a leg of the present invention as viewed at location A-A.

The present invention is directed to an animal feeder of the design shown in U.S. Pat. No. D677,017 S, issued on Feb. 26, 2013. The teachings of U.S. Pat. No. D677,017 S are incorporated herein by reference in their entirety. The animal feeder of this invention can be adapted to hold feed for different types of domesticated or wild animals. The animal feed trough may be adapted to the animal, based on the height and body structure of the animal as well as the type of feed to be utilized. For example, a feeder for deer should be designed so that deer of all sizes can easily access grains, commercial feed mixtures, grasses or other feed within the animal feed trough within the ordinary movement range of the deer's neck.

The animal feed trough of this invention is designed for ease of manufacture, shipping, and assembly of the component parts. In particular, the animal feed trough has four legs 1, 2, 3 and 4, which include slots 11, 12, 13 and 14 that extend the entire length of the legs. In the preferred embodiment each leg 1, 2, 3 and 4 includes two slots, each of which is adapted to accept an end from one of four panels (left end 5, front side 6, right end 7, and back side 8) that are adapted to fit within the slots 11, 12, 13 and 14 of the legs 1, 2, 3 and 4. The end slots 12 and 14 are positioned on the legs 1, 2, 3 and 4 such that they are on the inside of the legs from front to back. The side slots 11 and 13 are positioned on the legs 1, 2, 3 and 4 such that they are on the inside of the legs of the animal feeder. Side slots 11 are on the inside of legs 1 and 2 on the left side of the animal feeder (as view from the front of the animal feeder) and side slots 13 are on the inside of legs 3 and 4 on the right side of the animal feeder (as viewed from the front of the animal feeder).

The left end 5 is adapted in size and shape to fit within end slots 12 and 14 and provide a seal between the left end 5 and the end slots 12 and 14 that is sufficient to prevent feed from being able to escape between the intersection of either the left end 5 and the left inner leg 1 or the left end 5 and the left outer leg 2. The right end 7 is adapted in size and shape to fit within end slots 12 and 14 and provide a seal between the right end 7 and the end slots 12 and 14 that is sufficient to prevent feed from being able to escape between the intersection of either the right end 7 and the right inner leg 3 or the right end 7 and the right outer leg 4. The upper edge 15 of the left end 5 may be flat, convex, concave, or of any ornamental shape desired, but must in any case provide a seal between the intersection of the left end 5, the left inner leg 1 and the left outer leg 2 that would be sufficient to prevent feed, such as grains, shelled corn or crushed corn, from escaping from the animal feed trough. The upper edge 17 of the right end 7 may be flat, convex, concave, or of any ornamental shape desired, but must in any case provide a seal between the intersection of the right end 7, the right inner leg 3 and the right outer leg 4 that would be sufficient to prevent feed from escaping from the animal feed trough.

The left end 5 and right end 7 have an end thickness M. The end thickness M may be different for the left end 5 and the right end 7. The end thickness M will generally be within the range of about 1 mm to about 55 mm. The end thickness M will preferably be within the range of about 3 mm to about 40 mm. The end thickness M will more preferably be within the range of about 5 mm to about 35 mm. The end thickness M will most preferably be within the range of about 7 mm to about 26 mm.

The front side 6 is adapted in size and shape to fit within side slots 11 and 13 and provide a seal between the front side 6 and the side slots 11 and 13 that is sufficient to prevent feed from being able to escape between the intersection of either the front side 6 and the left inner leg 1 or the front side 6 and the right outer leg 4. The back side 8 is adapted in size and shape to fit within side slots 11 and 13 and provide a seal between the back side 8 and the side slots 11 and 13 that is sufficient to prevent feed from being able to escape between the intersection of either the back side 8 and the right inner leg 3 or the back side 8 and the right outer leg 4. The lower edge 16 of the front side 6 may be flat, convex, concave, or any ornamental shape desired, but must in any case provide a seal between the intersection of the front side 6 and the bottom 9 that would be sufficient to prevent feed from escaping from the animal feed trough. The lower edge 18 of the back side 8 may be flat, convex, concave, or any ornamental shape desired, but must in any case provide a seal between the intersection of the back side 8 and the bottom 9 that would be sufficient to prevent feed from escaping from the animal feed trough.

The front side 6 and back side 8 have a side thickness N. The end thickness N may be different for the front side 6 and back side 8. The side thickness N will generally be within the range of about 1 mm to about 55 mm. The side thickness N will preferably be within the range of about 3 mm to about 40 mm. The side thickness N will more preferably be within the range of about 5 mm to about 35 mm. The side thickness N will most preferably be within the range of about 7 mm to about 26 mm.

The slots 11, 12, 13 and 14 provide the advantage over the prior art in that they do not require a start point or an end point each of which would require precise positioning in order for the front, side, and end panels of such a feeder to fit within the fixed dimensions of the slots. The requirement for precise positioning of such a fixed dimension slot in prior art feeders increases the complexity of the manufacturing leg having slots which require such precise dimensions. This complexity associated with prior art designs adds labor requirements in manufacturing and an additional quality control parameter which leads to higher manufacturing costs as well as higher levels of rejected parts which must be scrapped. To the contrary, the slots 11, 12, 13 and 14 of the present invention continue the entire length of the leg and must only have the required depth C and Z, width B and Y, and angles $\alpha$, $\beta$, $\gamma$ and $\delta$.

Depth Z of the end slots 12 and 14 must be sufficient to retain the left end 5 and right end 7 within the end slots 12 and 14. Depth Z will generally be within the range of about 2 mm to about 30 mm. Depth Z will preferably be within the range of about 5 mm to about 25 mm. Depth Z will more preferably be within the range of about 8 mm to about 20 mm.

Depth C of the side slots 11 and 13 must be sufficient to retain the front side 6 and back side 8 within the side slots 11 and 13. Depth C will generally be within the range of about 2 mm to about 30 mm. Depth C will preferably be within the range of about 5 mm to about 25 mm. Depth C will more preferably be within the range of about 8 mm to about 20 mm.

Width Y of the end slots 12 and 14 must be at least 1 mm larger than the end thickness M to allow the left end 5 and right end 7 to assemble easily within the end slots 12 and 14. Width Y must also increase based on angles $\alpha$ and 6 so that the left end 5 and right end 7 can be assembled to a depth sufficient to retain the left end 5 and right end 7 within the end slots 12 and 14. The amount of increase required for width Y based on depth Z and angles $\gamma$ and $\delta$ will readily be understood by one of ordinary skill in the art. Angles $\gamma$ and $\delta$ do not need to be the same dimension as each other, but should in any case be at least 90°. Angles $\gamma$ and $\delta$ are generally within the range of about 90° to about 120°. Angles $\gamma$ and $\delta$ are preferably within the range of about 90° to about 110°. Angles $\gamma$ and $\delta$ are more preferably within the range of about 90° to about 105°. Angles $\gamma$ and $\delta$ are most preferably within the range of about 90° to about 100°.

Width B of the side slots 11 and 13 must be at least 1 mm larger than the side thickness N to allow the front side 6 and back side 8 to assemble easily within the side slots 11 and 13. Width B must also increase based on angles $\alpha$ and $\beta$ so that the front side 6 and back side 8 can be assembled to a depth sufficient to retain the front side 6 and back side 8 within the side slots 11 and 13. The amount of increase required for width B based on depth C and angles $\alpha$ and $\beta$ will readily be understood by one of ordinary skill in the art. Angles $\alpha$ and $\beta$ do not need to be the same dimension as each other, but should in any case be at least 90°. Angles $\alpha$ and $\beta$ are generally within the range of about 90° to about 120°. Angles $\alpha$ and $\beta$ are preferably within the range of about 90° to about 110°. Angles $\alpha$ and $\beta$ are more preferably within the range of about 90° to about 105°. Angles $\alpha$ and $\beta$ are most preferably within the range of about 90° to about 100°.

Each of the inside legs 1 and 3 has a positioning means which is adapted to position one of the inside legs 1 or 3 relative to one of the outside legs 2 or 4. In a preferred embodiment the positioning means on each of the inside legs 1 and 3 is a slot 30 which is located on the outside face 32 of each of the inside legs 1 and 3 which is opposite the side slot 11. Each of the outside legs 2 and 4 has a positioning means which is adapted to position one of the outside legs 2 or 4 relative to one of the inside legs 1 or 3. In a preferred embodiment the positioning means on each of the outside legs 2 and 4 is a slot 31 which is located on the inside face of each of the outside legs 2 and 4 which also includes the side slot 13.

The front side 6 and back side 8 are retained in the side slots 11 and 13 by an affixing means. The affixing means can be a set of holes 33 in the front side 6 and back side 8 and corresponding holes in the legs 1, 2, 3 and 4 which are adapted to accept dowels 10. The affixing means can also be nails that can be driven into a leg 1, 2, 3 or 4 and either the front side 6 or the back side 8. The affixing means can also be adhesive used between the side edge of the front side 6 or back side 8 and the side slots 11 and 13.

Because the animal feed trough is designed for ease of assembly, the animal feed trough may be supplied as a kit which may be assembled with only a minimal number of tools being required. Typically, only a hammer is required for complete assembly of the animal feed trough of this invention. The kit would include a left inside leg 1, a left outside leg 2, a right inside leg 3, a right outside leg 4, a left end 5, a front side 6, a right end 7, a back side 8, a bottom 9. The kit may also include an affixing means 10, such as dowels, an adhesive, or screws. Wooden dowels are typically preferred so that the animal feed trough can be constructed solely with wood and in which case it will be completely biodegradable. In another scenario all of the component parts of the animal feeder can be comprised of a plastic, such as polyethylene (including recycled polyethylene) which has a simulated wood surface texture and color. For instance, the plastic component parts can be sanded to provide a simulated wood grain surface texture and can be colored as needed to provide a realistic wood color. The advantage of using plastic is that it is highly resistant to biodegrading even after exposure to the elements.

This invention is illustrated by the following examples that are merely for the purpose of illustration and are not to be regarded as limiting the scope of the invention or the manner in which it can be practiced.

EXAMPLE 1

An animal feed trough was assembled by positioning the left outside leg 2 onto the left inside leg 1 so that the positioning means 30 of the left outside leg 2 interconnected with the positioning means 31 of the left inside leg 1. The left end 5 was then assembled into the end slot 14 on the left inside leg 2 and the end slot 12 on the left inside leg 1. A first shorter edge of the front side 6 was then positioned into the side slot 13 on the first outside leg 2. A first shorter edge of the back side 8 was then positioned into the side slot 11 on the left inside leg 1. The right inside leg 3 was then positioned onto a second shorter edge of the back side 8. The right outside leg 4 was then placed onto a second shorter edge of the front side 6 and onto the right inside leg 3 so that the positioning means 31 of the right outside leg 4 interconnected with the positioning means 30 of the right inside leg 3. The right end 7 was then assembled into the end slot 12 on the right inside leg 3 and the end slot 14 on the right outside leg 4. The bottom 9 was then positioned so that a first longer edge of the bottom 9 rested on the front side 6 and a second longer edge of the bottom 9 rested on the back side 8. The front side 6 and the back side 8 were then affixed to the legs 1, 2, 3 and 4 by use of the dowels 10.

While certain representative embodiments and details have been shown for the purpose of illustrating the subject invention, it will be apparent to those skilled in this art that various changes and modifications can be made therein without departing from the scope of the subject invention.

What is claimed is:

1. An animal feed trough which is comprised of a first inside leg and a second inside leg, a first outside leg and a second outside leg, a first side and a second side, a first end and a second end, and a bottom, wherein the first inside leg and the second inside leg each include an end slot, wherein the end slots extend the entire distance of each inside leg, wherein the end slot of the first inside leg is adapted to accommodate a portion of the first end, wherein the end slot of the second inside leg is adapted to accommodate a portion of the second end, wherein the first outside leg and the second outside leg each include an end slot, wherein each of the outside legs includes end slots which extend the entire distance of each outside leg, wherein the end slot of the first outside leg is adapted to accommodate a portion of the first end, wherein the end slot of the second outside leg is adapted to accommodate a portion of the second end, wherein the first inside leg and the second inside leg each include a side slot, wherein the side slots extend the entire distance of each inside leg, wherein the side slot of the first inside leg is adapted to accommodate a portion of the first side, wherein the side slot of the second outside leg is adapted to accommodate a portion of the second side, wherein the first outside leg and the second outside leg each include a side slot, wherein the side slots extend the entire distance of each outside leg, wherein the side slot of the first outside leg is adapted to accommodate a portion of the second side, wherein the side slot of the second outside leg is adapted to accommodate a portion of the second side, and wherein each inside leg includes a positioning means for positioning one of the outside legs relative to the inside leg, and wherein each outside leg includes a positioning means for positioning one of the inside legs relative to the outside leg.

2. The animal feed trough of claim 1, wherein both sides are identical and both ends are identical.

3. The animal feed trough of claim 1, wherein both sides are affixed to both the inside and the outside legs by an affixing means.

4. The animal feed trough of claim 3, wherein the affixing means is comprised of dowels.

5. The animal feed trough of claim 3, wherein the affixing means is comprised of nails or screws.

6. The animal feed trough of claim 3, wherein the affixing means is comprised of adhesive.

7. The animal feed trough of claim 1, wherein the side slots which extend the entire distance of both the inside legs and the outside legs and are adapted to accommodate a portion of one of the sides have a first included angle $\alpha$ which is within a range of about 90° to about 120° and a second included angle $\beta$ which is within a range of about 90° to about 120°.

8. The animal feed trough of claim 1, wherein the side slots which extend the entire distance of both the inside legs and the outside legs and are adapted to accommodate a portion of one of the sides, have a first included angle $\alpha$ which is within a range of about 90° to about 110° and a second included angle $\beta$ which is within a range of about 90° to about 110°.

9. The animal feed trough of claim 1, wherein the side slots which extend the entire distance of both the inside legs and the outside legs and are adapted to accommodate a portion of one of the sides have a first included angle $\alpha$ which is within a range of about 90° to about 105° and a second included angle $\beta$ which is within a range of about 90° to about 105°.

10. The animal feed trough of claim 1, wherein the side slots which extend the entire distance of both the inside legs and the outside legs and are adapted to accommodate a portion of one of the sides, have a first included angle α which is within a range of about 90° to about 100° and a second included angle β which is within a range of about 90° to about 100°.

11. The animal feed trough of claim 1, wherein the end slots which extend the entire distance of both the inside legs and the outside legs and are adapted to accommodate a portion of one of the ends, have a angle γ which is within a range of about 90° to about 120° and a second angle δ which is within a range of about 90° to about 120°.

12. The animal feed trough of claim 1, wherein the end slots which extend the entire distance of both the inside legs and the outside legs and are adapted to accommodate a portion of one of the ends, have a angle γ which is within a range of about 90° to about 110° and a second angle δ which is within a range of about 90° to about 110°.

13. The animal feed trough of claim 1, wherein the end slots which extend the entire distance of both the inside legs and the outside legs and are adapted to accommodate a portion of one of the ends, have a angle γ which is within a range of about 90° to about 105° and a second angle δ which is within a range of about 90° to about 105°.

14. The animal feed trough of claim 1, wherein the end slots which extend the entire distance of both the inside legs and the outside legs and are adapted to accommodate a portion of one of the ends, have a angle γ which is within a range of about 90° to about 100° and a second angle δ which is within a range of about 90° to about 100°.

15. A method of assembling an animal feed trough comprising
    positioning a first outside leg onto a first inside leg so that a positioning means of the first outside leg interconnects with a positioning means of the first inside leg, assembling a first end into an end slot on the first inside leg and assembling the first end into an end slot on the first outside leg,
    positioning a first shorter edge of a first side into a side slot on the first inside leg, positioning a first shorter edge of a second side into a side slot on the first outside leg,
    positioning a second inside leg onto a second shorter edge of the first side, positioning a second outside leg onto a second shorter edge of the second side and positioning the second outside leg onto the second inside leg so that a positioning means of the second outside leg interconnects with a positioning means of the second inside leg,
    assembling a second end into an end slot on the second inside leg and assembling the second end into an end slot on the second outside leg, and
    positioning a bottom between the first side and the second side.

16. The animal feed trough of claim 1, wherein the side slots of both the inside legs and the outside legs have a width B which is at least 1 mm wider than the width N of both the first side and the second side.

17. The animal feed trough of claim 1, wherein the end slots of both the inside legs and the outside legs have a width Y which is at least 1 mm wider than width M of both the first end and the second end.

18. The animal feed trough of claim 1, wherein the side slots of both the inside legs and the outside legs have a depth C which is within a range of about 5 mm to about 25 mm.

19. The animal feed trough of claim 1, wherein the end slots of both the inside legs and the outside legs have a depth C which is within a range of about 5 mm to about 25 mm.

* * * * *